(12) United States Patent
Frentz et al.

(10) Patent No.: US 6,853,717 B1
(45) Date of Patent: Feb. 8, 2005

(54) METHOD AND APPARATUS FOR ELIMINATING UNWANTED TELEPHONE CALLS

(75) Inventors: Michael Joseph Frentz, Laurel, MD (US); Theodore Reed Farrell, Penfield, NY (US)

(73) Assignee: Verizon Corporate Services Group Inc., New York, NY (US)

( * ) Notice: Subject to any disclaimer, the term of this patent is extended or adjusted under 35 U.S.C. 154(b) by 573 days.

(21) Appl. No.: 09/871,024

(22) Filed: May 31, 2001

(51) Int. Cl.[7] .......................... H04M 1/66; H04M 3/42; H04M 15/00
(52) U.S. Cl. ............................. 379/210.02; 379/114.28; 379/142.04; 379/196; 379/210.03
(58) Field of Search ........................ 379/114.05, 114.1, 379/114.13, 114.21, 114.22, 114.26, 114.28, 114.29, 142.04, 188, 196, 197, 198, 199, 200, 210.02, 210.03

(56) References Cited

U.S. PATENT DOCUMENTS 6,353,663 B1 * 3/2002 Stevens et al. ........ 379/114.22
6,549,619 B1 * 4/2003 Bell et al. .............. 379/210.02

* cited by examiner

*Primary Examiner*—Harry S. Hong
(74) *Attorney, Agent, or Firm*—Leonard C. Suchyta, Esq.; Joel Wall, Esq.; Finnegan, Henderson, Farabow et al

(57) ABSTRACT

In accordance with the principles of the present invention, unwanted calls may be prevented. In particular, information about a particular destination is stored in a registry at a clearinghouse server located within a network, e.g., the public telephone network. When a call is being made to the destination, it is routed to the clearinghouse server. Identifying information such as caller-id data is retrieved and the registry is searched. If the caller is registered as being approved, the call is forwarded with information indicating that the call is "approved". If the caller is not registered or is unknown, the call is forwarded with information indicating that call is "unregistered" or "unavailable". A user at the destination is then able to quickly determine if the call is unwanted. Alternatively, a user may be compensated for answering calls from an "unregistered" caller, thereby encouraging businesses to focus their telemarketing efforts by imposing a cost on them for unsolicited phone calls and providing compensation to users accepting calls from unregistered callers.

32 Claims, 4 Drawing Sheets

| Host ID | Approved Sources | Account | Balance |
|---------|------------------|---------|---------|
|         |                  |         |         |

FIG. 3

METHOD AND APPARATUS FOR ELIMINATING UNWANTED TELEPHONE CALLS

FIELD OF THE INVENTION

The present invention relates to methods and apparatus for eliminating unwanted telephone calls.

BACKGROUND OF THE INVENTION

Today, many businesses use telemarketing techniques. Telemarketing techniques are often used for contacting potential sales leads, conducting market research, and promoting various products. Known telemarketing techniques include: telephone calls from operators in a call center; voicemails, e.g., on answering machines; faxes; emails; and text messages.

For example, a telephone call from an operator in a call center is a frequently used telemarketing technique. Typically, businesses obtain calling lists from a variety of sources. For example, lists can be obtained from various marketing organizations and retailers. Unfortunately, it is difficult to predict which consumers will be receptive to a telemarketing call. Even if a consumer is interested in being called regarding a particular product or subject, there are few mechanisms available which forward this interest to the appropriate business. Consequently, businesses are often forced to call a large number of consumers in order to eventually find an interested consumer. Thus, many telemarketing calls are unwanted and unsuccessful.

However, as a result of receiving numerous unwanted telemarketing calls, telemarketing has become unpopular with many consumers. For example, due to public outcry, U.S. Federal law requires organizations which conduct telemarketing to maintain a "do-not-call" list. However, "do-not-call" lists are difficult to maintain and are often out of date.

Some consumers have also tried using caller-id services in order to screen out unwanted calls. Caller-id services can be used to identify the phone number of a caller. Unfortunately, a caller can have its identity blocked from caller-id services. For example, a person can elect to have his/her caller-id number blocked from being sent. Many telemarketing calls have caller-id blocked and, thus, are identified as being "unavailable." This forces the consumer to answer a call without knowing if the call is a telemarketing call or, e.g., from a friend who happens to have caller-id blocked. Thus, despite these mechanisms, i.e., "do-not call" lists and caller-id, consumers still receive unwanted calls.

Moreover, many consumers now own fax machines. Unwanted telephone calls to a consumer's fax machine, e.g., an unwanted telemarketing fax, incur costs associated with the fax paper and toner. Thus, a consumer may want to avoid unwanted telephone calls to his/her fax machine.

Mobile telephones, such as cellular telephones, have also become popular. Many mobile telephones are now capable of receiving, e.g., emails, and text messages, in addition to phone calls. However, a consumer often pays charges based on usage, such as air time minutes for receiving or making a telephone call. Unfortunately, telemarketing calls, emails, and text messages to a consumer's mobile telephone may cause the consumer to incur higher charges, e.g., for air time associated with the telemarketing. Thus, a consumer may also want to avoid unwanted telephone calls at his/her mobile telephone, as well.

SUMMARY OF THE INVENTION

In accordance with the principles of the present invention, a method of eliminating an unwanted connection to a destination associated with a node in a network comprises: receiving, at the node, a signal requesting a connection to the destination; determining a source of the signal; determining, at the node, information reflecting a desire on behalf of the destination to accept a connection from the source; and requesting the connection between the source and the destination based on the determination.

In accordance with another aspect of the present invention, a system for eliminating an unwanted connection to a destination associated with a node in a network comprises: means for receiving, at the node, a signal requesting a connection to the destination; means for determining a source of the signal; means for determining, at the node, information reflecting a desire on behalf of the destination to accept a connection from the source; and means for requesting the connection between the source and the destination based on the determination.

In accordance with yet another aspect of the present invention, a computer-readable medium capable of configuring a computer to perform a method of eliminating an unwanted connection to a destination associated with a node in a network comprises: program code for receiving, at the node, a signal requesting a connection to the destination; program code for determining a source of the signal; program code for determining, at the node, information reflecting a desire on behalf of the destination to accept a connection from the source; and program code for requesting the connection between the source and the destination based on the determination.

In accordance with yet another aspect of the present invention, a node within a network for eliminating unwanted calls comprises: an input for receiving a signal, from a source, requesting a connection to a destination; a processor for determining a source of the signal; a registry for storing information reflecting a desire on behalf of the destination to accept a connection from the source; and a signaling module for providing the information to the destination and requesting the connection between the source and the destination.

In accordance with yet another aspect of the present invention, a computer-readable medium referenced by a node within a network for eliminating unwanted phone calls comprises: information identifying at least one destination; information identifying at least one source; and information reflecting a desire on behalf of the at least one destination to accept a connection from the at least one source.

In accordance with yet another aspect of the present invention, a processor within a network for eliminating unwanted calls comprises: an input means for receiving a signal requesting a connection to destination; a module for determining a source of the signal; a module for determining information reflecting a desire on behalf of the destination to accept a connection from the source; and an output means for requesting a connection between the source and the destination based on the determination.

In accordance with yet another aspect of the present invention, a node for receiving a connection across a network comprises: an input means for receiving a signal requesting a connection from a source; means for identifying information reflecting a desire on behalf of the node to accept the connection from the source; and means for establishing the connection between the node and the source based on the information.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the figures:

FIG. 3 illustrates the information stored in a database used by the clearinghouse server in accordance with methods and apparatus consistent with the present invention.

DETAILED DESCRIPTION

In accordance with the principles of the present invention, unwanted calls are prevented. Methods and apparatus consistent with the present invention utilize a registry, and a clearinghouse server within a network, e.g., the public switched telephone network to store information about a destination. When a call is being made to the destination, it is routed to the clearinghouse server. Identifying information such as caller-id data is retrieved and the clearinghouse server searches the registry. If the caller is registered as being approved, the call is forwarded with information indicating that the call is "approved". If the caller is not registered as being approved or is unknown, the call is forwarded with information indicating that call is "unregistered" or "unavailable". A user at the destination may then be compensated for answering an unregistered call. The user may also reclassify a call from unregistered to registered status causing any futures calls from that source to be identified as "approved".

The following description of embodiments of this invention refers to the accompanying drawings. Where appropriate, the same reference numbers in different drawings refer to the same or similar elements.

Figure 1:
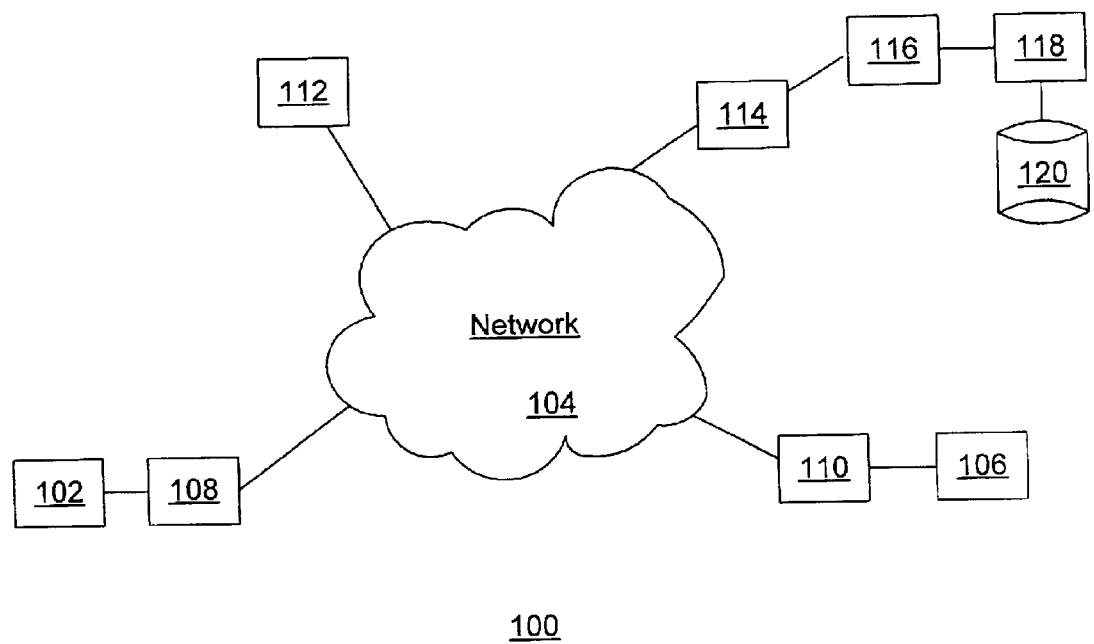
FIG. 1 is a diagram of a telecommunications network in accordance with methods and apparatus consistent with the present invention.

FIG. 1 is a diagram of a telecommunications network in accordance with methods and apparatus consistent with the present invention. As shown in FIG. 1, a telecommunications network 100 may comprise switches 108 and 110, signal transfer points (STPs) 112 and 114, a signal control point ("SCP") 116, a clearinghouse server 118, and a database 120.

Source 102 may connect to switch 108 coupled to a Public Switched Telephone Network ("PSTN") network 104 and may have an associated STP 112. Source 102 may be, for example, a telephone, a mobile telephone (e.g., a cellular telephone), a computer, or an organization's call center conducting a telemarketing campaign. However, any type of source capable of making a call is within the principles of the present invention.

A call may be any type of communication between source 102 and a destination 106. For example, a call may be a telephone call from a person, e.g., an operator in a telemarketing call center. A call may also include communications such as faxes, emails, and text messages. Any type of communication which can be carried over a telephone call or telephone call signaling is within the principles of the present invention.

Destination 106 may connect to switch 110 coupled to network 104 and may have an associated STP 114. Destination 106 may be, for example, a telephone, a mobile telephone (e.g., a cellular telephone), a private branch exchange, a call center, or a computer. Any type of device that is capable of receiving a call is within the principles of the present invention.

Switches 108 and 110 may serve interfaces to network 104. Switches 108 and 110 may be configured as a voice switch, Signaling System 7 (SS7) switch, or a computer coupled to a switch. Switches 108 and 110 may include, for example, a 5ESS™, DMS-100™ (or DMS-200™), GTD-5™, or an EWSD™ switching system manufactured by Lucent Technologies, Inc., Nortel Networks Corporation, AGCS, and Siemens, respectively. However, any device capable of routing a call is within the principles of the present invention. As explained below in detail, switches 108 and 110 may be configured to communicate with STPs 112 and 114 in order to route a call from source 102 to destination 106.

STPs 112 and 114 may forward information through network 104 and route calls from switches 108 and 110. For example, STPs 112 and 114 may route call signaling messages such as, Advanced Intelligent Network (AIN), IS-41, and SS7 messages for telecommunications network 100. In one embodiment, STPs 112 and 114 may route call signaling messages via network 104. Alternatively, STPs 112 and 114 may route call signaling messages via a separate signaling network such as, an SS7 network (not shown), or an Internet Protocol (IP) network (not shown).

SCP 116 may interface with clearinghouse server 118 and database 120. Service Control Point (SCP) may include an AI-NET™, Integrated Service Control Point (ISCP™), or Service Builder™ equipment/software manufactured or provided by Lucent Technologies, Inc., Telcordia Technologies, Inc., and Nortel Networks Corporation, respectively. Clearinghouse server 118 may be implemented as dedicated hardware or as software integrated within another device, e.g., SCP 116.

Database 120 may store information describing destination 106 and source 102. For example, database 120 may include billing information, information concerning services provided to destination 106, i.e., caller-id service information, and information indicating whether destination 106 approves of receiving a call from a source. Database 120 may also include information for destination 106 such as an address, phone number, credit card number and a list of various callers from which calls may be approved. Other information may be stored in database 120 as well.

Caller-id service may enable a subscriber to see a display of information associated with the caller, including the callers phone number. In one embodiment, caller-id information may be integrated within a computer, e.g., a personal computer. Alternatively, caller-id information may be presented via a caller-id display.

Database 120 may modified by clearinghouse server 118 according to behavior of destination 106. For example, if destination 106 accepts calls from a business selling, e.g., sporting goods, then clearinghouse server 118 may modify database 120 such that other sporting goods businesses may be automatically indicated as being approved. Alternatively, if calls from a business selling, e.g., financial services are rejected, then clearinghouse server 118 may modify database 120 such that calls from other financial services may be automatically indicated as being not approved.

Clearinghouse server 118 and database 120 may be implemented in a variety of locations within telecommunications network 100. For example, clearinghouse server 118 and database 120 may be located within SCP 116. Alternatively, clearinghouse server 118 and database 120 may be located within switch 110. Other locations within telecommunications network 100 may be used instead.

Figure 2:
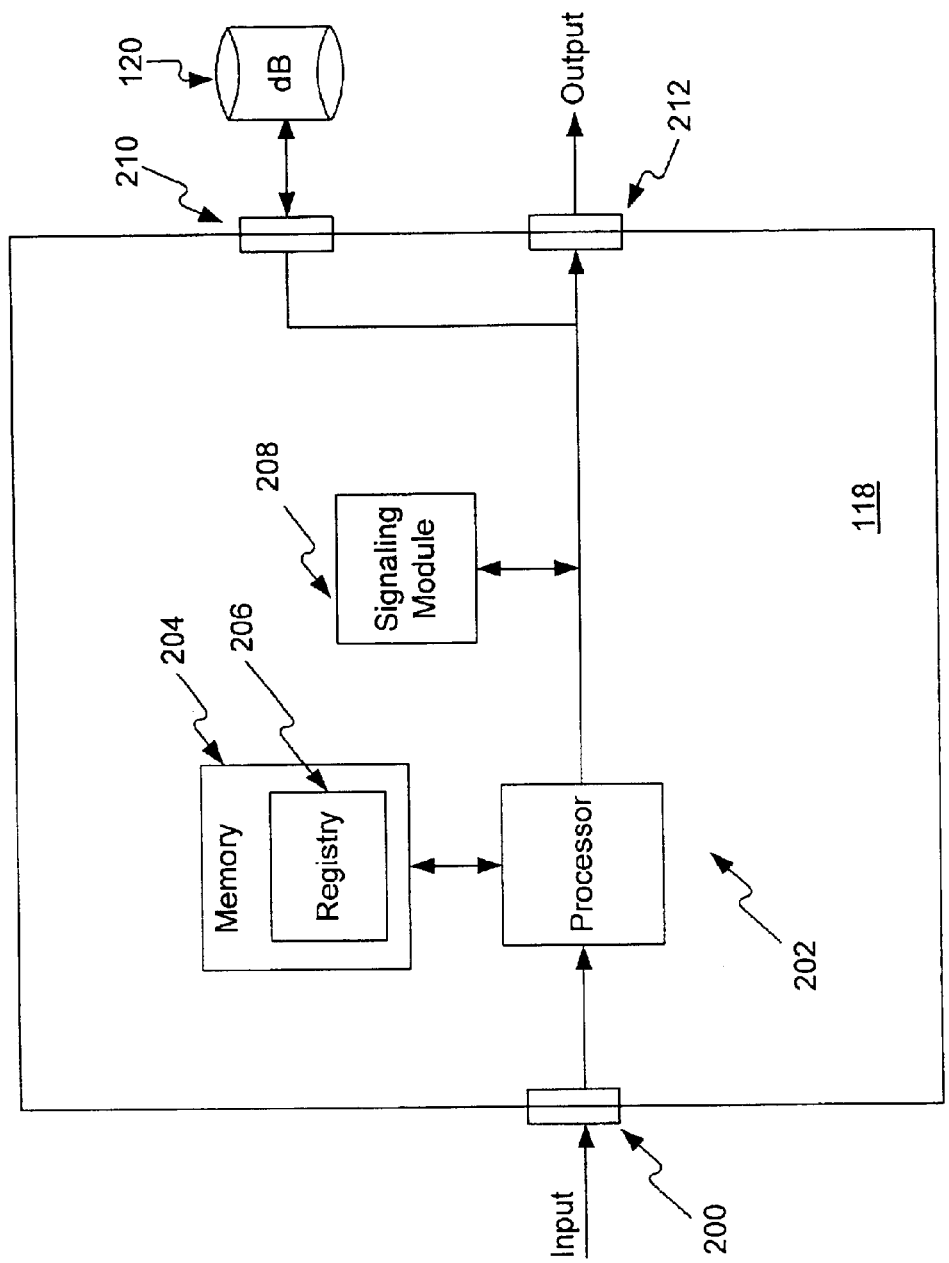
FIG. 2 is a block diagram of a clearinghouse server in accordance with methods and apparatus consistent with the present invention.

FIG. 2 is a block diagram of a clearinghouse server in accordance with methods and apparatus consistent with the present invention. As shown, clearinghouse server 118 may comprise a processor 202, which connects to a memory 204, a signaling module 208, an input 200, a database interface port 210, and an output 211.

Input 200 and output 212 may provide communications ports to interface clearinghouse server 118 with network 104, e.g., via SCP 116. Although, input 200 and output 212 may be shown as separate ports, a dual-purpose port may be provided to serve as both input and output port. Alternatively, multiple input/output ports may be implemented within clearinghouse server 118. Other implementations for interfacing the clearinghouse server 118 with network 104 may be used as well.

The database interface port 210 provides an interface between database 120 and clearinghouse server 118. Although database interface port 210, input port 200, and output port 212 are shown as separate ports, one or more multi-function ports may be implemented to serve as a database interface port, input port, or output port. In addition, multiple input/output ports and database interface ports may be implemented within clearinghouse server 118. Other implementations for interfacing the clearinghouse server 118 with database 120 may be used as well, in accordance with the principles of the present invention.

Signaling module 208 may transmit and receive signaling information such as, AIN and IS-41 messages. For example, signaling module 208 may convert signaling information to AIN or IS-41 messages and transmit the messages to STP 114, switch 110 and destination 106, e.g., first and second ring signals. Signaling module 208, under instructions from processor 202, may generate caller-id signaling information that may be interleaved with the signaling messages to STP 114. For example, caller-id signaling information may be transmitted as a Bell 202 modem signal between a first and second ring signal.

Memory 204 may include a registry 206. Registry 206 may include entries used to evaluate calls to destination 106 and to identify source 102 prior to establishing a connection between source 102 and destination 106. For example, registry 206 may be indexed according Public Office Dialing Plan (PODP) numbers for source 102 and destination 106. A three, six, or ten digit string such as, an area code, an area code and an office code may be used. Other information for identifying the source 102 and destination 106 may be used as well.

A description of PODP numbers may be found in AIN 0.1 standards TR-NWT-001284: Advanced Intelligent Network (AIN) 0.1 Switching System Generic Requirements, Issue 1 (August 1992) and TR-NWT-001285: Advanced Intelligent Network (AIN) 0.1 Service Control Point (SCP) Application Protocol Interface Requirements, Issue 1 (August 1992), both of which are incorporated herein by reference.

Alternatively, Specific Digit String (SDS) numbers may be used to index registry 206. A description of SDS may be found in AIN 0.2 standards GR-1298-CORE: AIN SSP, AINGR: Switching Systems (A Module Of AINGR, FR-15), Issue 4 (September 97) and GR-1299-CORE: AINGR: Switch-Service Control Point (SCP)/Adjunct Interface (A Module Of AINGR, FR-15), Issue 4 (September 97), both of which are incorporated herein by reference.

Figure 3:
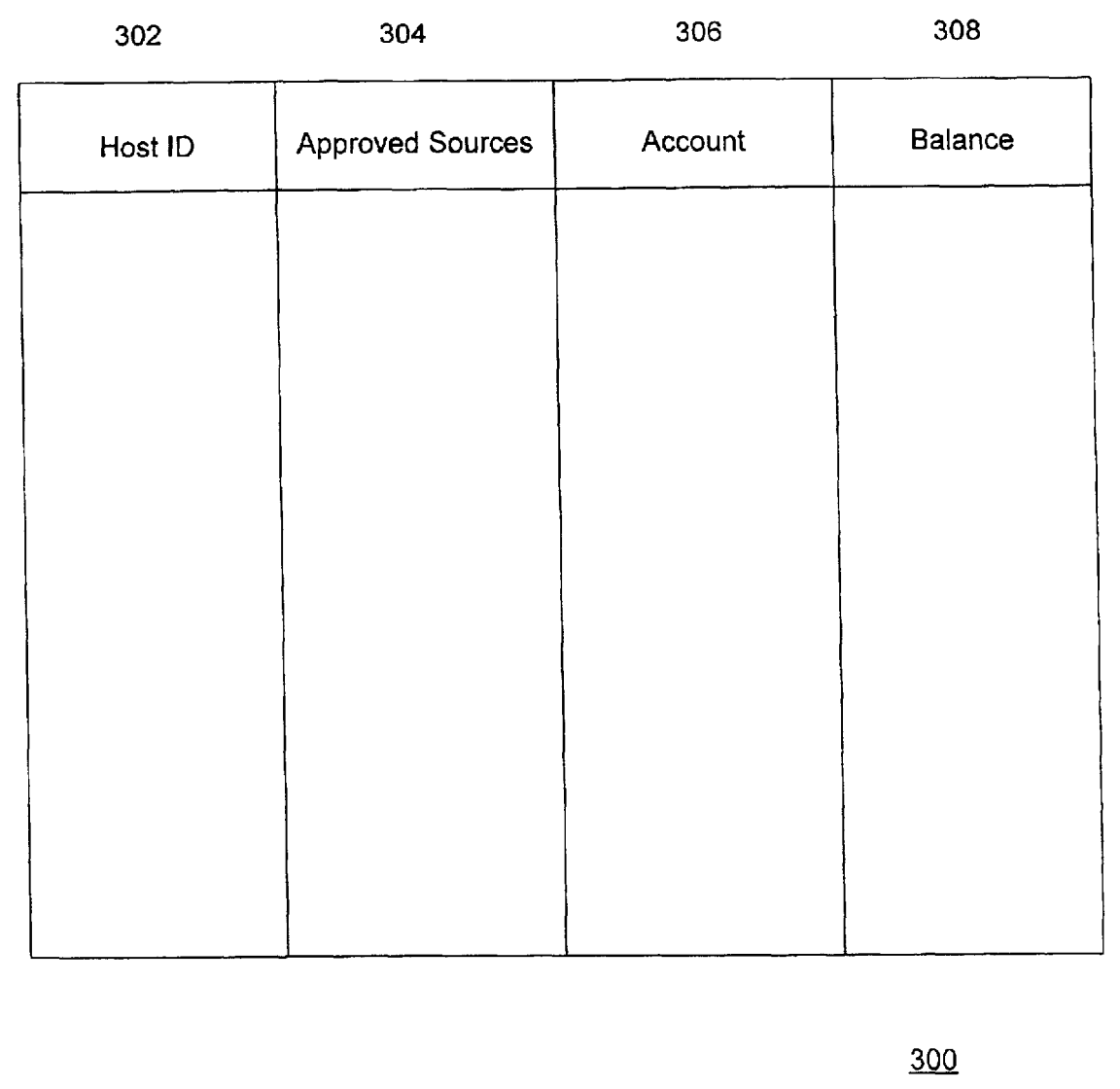

FIG. 3 illustrates the information stored in a database 120 that may be used by the clearinghouse server 118 in accordance with methods and apparatus consistent with the present invention. A table 300 may be stored in database 120 which may include a host ID column 302, an approved sources column 304, an account number column 306, and a balance column 308.

Host ID column 302 may identify various destinations, e.g., destination 106. Approved sources column 304 may identify those sources for which a particular destination has indicated a desire to approve a call. Host ID column 302 and approved sources column 304 may be formatted similar to registry 206. For example, host ID column 302 and approved sources column 304 may provide the PODP number for destination 106 and source 102 respectively. Alternatively, SDS numbers may be used. Other formats for the host ID column 302 and approved sources column 304 may also be used in accordance with the principles of the present invention. Alternatively, column 304 may be used to identify sources that may be specifically "not" approved by a destination.

Account number column 306 may identify the account for destination 106 to which a credit, if any, may be paid in exchange for accepting a call from a particular source. For example, account number column 306 may use a credit card number of the user at destination 106. Alternatively, a wire transfer account number may be used. Other information may be used in the account number column 306 as well.

Balance column 308 may indicate balance, if any, associated with the destination 106. For example, the account for destination 106 may be credited each time a call is accepted from source 102. Alternatively, an entry in the database 120 may indicate a standard payment to be credited for accepting calls from an unregistered source. Other ways of providing incentives to a destination to accept calls from a source may be used in accordance with the principles of the present invention.

Figure 4:
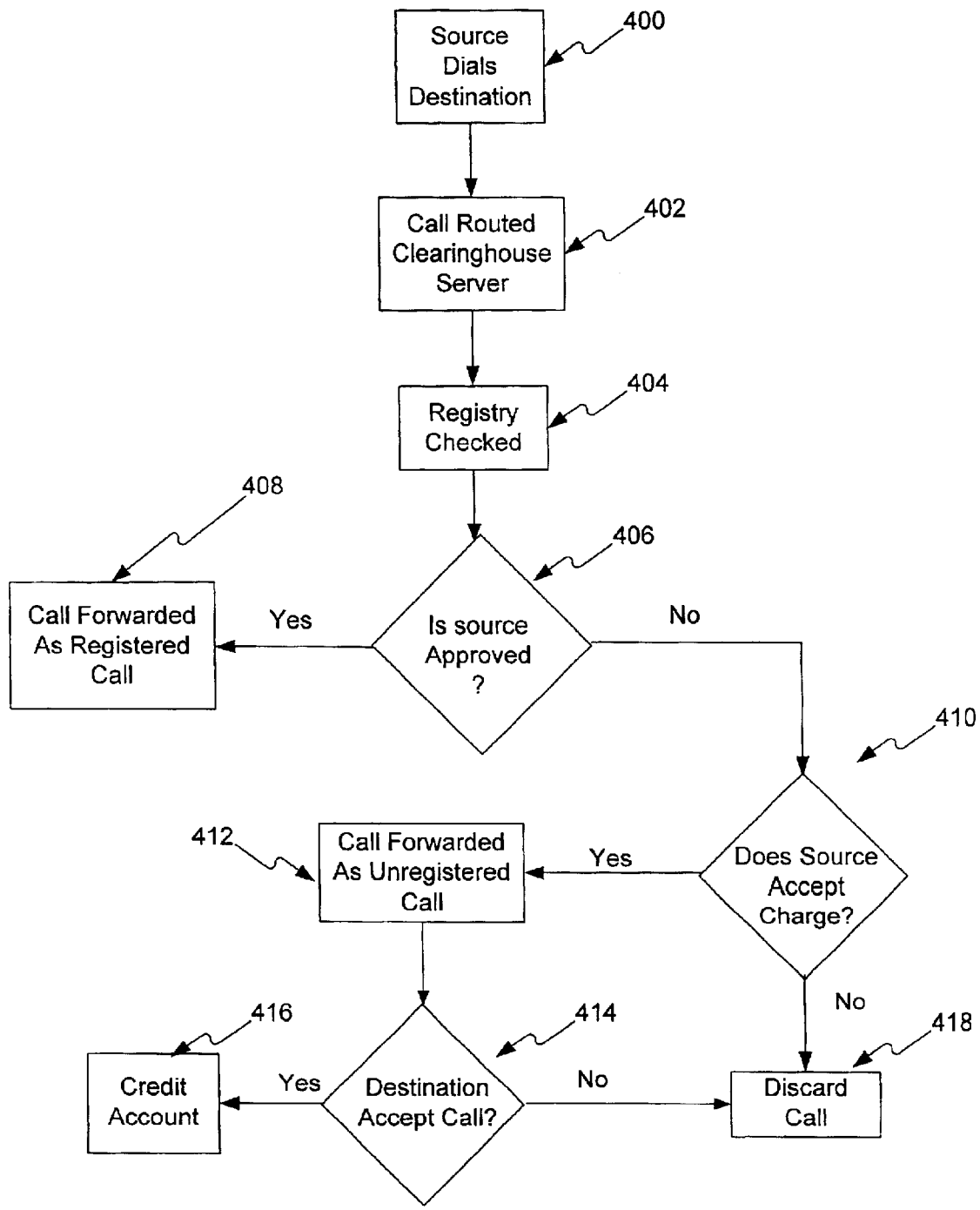
FIG. 4 is a flow chart of the steps performed when a source originates a call to a destination in accordance with methods and apparatus consistent with the present invention.

FIG. 4 is a flow chart of the steps performed when a source originates a call to a destination in accordance with methods and apparatus consistent with the present invention. In step 400, source 102 may originate a call by dialing the phone number for destination 106. Switch 108 may receive the dialing signals from source 102 and send call request signaling to STP 112. STP 112 may then determine the associated STP for destination 106, i.e., STP 114.

In step 402, STP 114 may receive the call request signaling information and may route it to clearinghouse server 118 via SCP 116. Clearinghouse server 118 may then utilize processor 202 and signaling module 208 to determine where the call is destined, i.e., destination 106 and the source of the call, i.e., source 102.

In step 404, processor 202 may refer to memory 204 and registry 206 to determine the services provided to destination 106. For example, registry 206 may indicate that destination 106 utilizes caller-id services and approved sources information.

The information stored within registry 206 may be provided by a wide variety of ways. For example, a user at destination 106 may provide the information via a registration process conducted by a survey form mailed to him/her. Alternatively, the registration process may be conducted, for example, by entering information on a web-page via the Internet, a telephone interview, an email, or via signals from the user at destination 106 (e.g., using interactive voice response or entering a series of digits) to change the approval status of source 102 in registry 206. Other processes for providing information stored in registry 206 may be used as well.

The registry 206 may be continuously updated according to the behavior of destination 106. For example, the registry 206 may be updated, e.g., depending upon the types of businesses from which destination 106 has accepted calls. Alternatively, the user at destination 106 may provide information to the registry 206, such as via an interactive voice response session or entering information at web site on the Internet. Other processes for maintaining the registry 206 may be used as well in accordance with the principles of the present invention.

In step 406, clearinghouse server 118 may refer to database 120 to determine whether source 102 may be found in approved sources column 304. Alternatively, column 304 may be used to indicate sources that may be disapproved (or "not" approved). If source 102 is found in approved sources column 304, then signaling module 208 may interleave caller-id information to indicate that the call from source 102 is "approved." Alternatively, caller-id information such as "registered", or "authorized" may be used instead. Other caller-id messages may be used in accordance with the principles of the present invention.

In step 408, the call may be forwarded to switch 110 and destination 106 with information indicating that the call from source 102 has been approved by destination 106, e.g., a "registered" caller-id message. Accordingly, a user at destination 106 may view the caller-id information and thus, make an informed decision as to whether the call is wanted or unwanted.

In step 410, if source 102 is not found in approved sources column 304, then a message may be provided to source 102 indicating that a charge may be required to complete the call and requests from source 102 whether charges are accepted.

In step 412, if source 102 accepts charges, then signaling module 208 may interleave caller-id information that indicates the call from source 102 is "unregistered." Alternatively, the caller-id information may be displayed as "unsolicited" or "paid". Other messages may be used in accordance with the principles of the present invention. The caller-id number for source 102 may also be displayed in addition to the caller-id message. For example, a text description of source 102, e.g., name of the business may be displayed.

The call from source 102 may then be forwarded to switch 110 and destination 106. Switch 110 may then send signaling information back to switch 108 via STPs 112 and 114, to indicate that source 102 accepted charges. Database 120 and registry 206 may then be updated to reflect this behavior by source 102.

In step 414, destination 106 determines whether to accept the call from source 102. Destination 106 may use a computer to interpret the caller-id information interleaved with the call request signaling. Alternatively, the caller-id information may be displayed at destination 106.

In step 416, if destination 106 accepts the call, then switch 110 may send signaling information to clearinghouse server 118. Clearinghouse server may then utilize signaling module 108 and processor 202 to modify the database 120 and registry 206 to reflect this behavior by destination 106. For example, in exchange for accepting calls from source 102, the account balance in column 308 may be updated for destination 106. Alternatively, source 102 may be registered as a free call and no credit is added to column 308. Other information for the destination 106 may be updated in accordance with the principles of the present invention.

In step 418, if source 102 does not accept charges, then the call may be discarded (or dropped) by switch 110. Switch 110 may then send signaling information back to switch 10B via STPs 112 and 114, to indicate that source 102 did not accept charges. Database 120 and registry 206 may then be updated to reflect this behavior by source 102.

Alternatively, if the destination 106 does not accept the call, then the call may be discarded (or dropped) by switch 110. Switch 110 may then send signaling information back to switch 108 via STPs 112 and 114, to indicate that the call was not accepted by destination 106. Accordingly, database 120 and registry 206 may be updated to reflect this behavior by destination 106.

Although aspects of one implementation may be depicted as being stored in memory, one skilled in the art will appreciate that all or part of methods and apparatus consistent with the present invention may be stored on or read from other computer-readable media, such as secondary storage devices, like hard disks, floppy disks, and CD-ROM.

Although specific components of a telecommunications network and clearinghouse server have been described, one skilled in the art will appreciate that the methods and apparatus consistent with the present invention may contain additional or different components. Other embodiments and modifications of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of eliminating an unwanted connection to a destination associated with a node in a network, comprising:
   receiving, at the node, a signal requesting a connection to the destination;
   determining a source of the signal;
   determining, at the node, preference information reflecting a desire on behalf of the destination to accept a connection from the source;
   requesting the connection between the source and the destination based on the determination of the preference information; and
   updating the preference information based on whether the connection is accepted in response to the connection request.

2. The method according to claim 1, further comprising the steps of:
   determining, at the node, whether the connection was accepted; and
   compensating the destination when the connection was accepted and the determination of the preference information resulted in a determination that the destination did not desire to accept the connection.

3. The method according to claim 1, wherein requesting the connection between the source and the destination, further comprises:
   sending a caller-id signal indicating the desire on behalf of the destination to accept the connection.

4. The method according to claim 1, wherein requesting the connection between the source and the destination, further comprises:

sending a caller-id signal indicating the destination does not desire to accept the connection.

5. The method according to claim 4, further comprising:
declining, at the destination, the connection based on the preference information.

6. A system for eliminating an unwanted connection to a destination associated with a node in a network, comprising:
means for receiving, at the node, a signal requesting a connection to the destination;
means for determining a source of the signal;
means for determining, at the node, preference information reflecting a desire on behalf of the destination to accept a connection from the source;
means for requesting the connection between the source and the destination based on the determination of the preference information; and
means for updating the preference information based on whether the connection is accepted in response to the connection request.

7. The system according to claim 6, further comprising:
means for determining, at the node, whether the connection was accepted; and
means for compensating the destination when the connection was accented and the means for determining preference information determined that the destination did not desire to accept the connection.

8. The system according to claim 6, wherein the means for requesting the connection between the source and the destination based on the determination, further comprises:
means for sending a caller-id signal indicating the desire on behalf of the destination to accept the connection.

9. The system according to claim 6, wherein the means for requesting the connection between the source and the destination based on the determination, further comprising:
means for sending a caller-id signal indicating the destination does not desire to accept the connection.

10. The system according to claim 6, further comprising:
means for declining, at the destination, the connection based on the preference information.

11. A computer-readable medium capable of configuring a computer to perform a method of eliminating an unwanted connection to a destination associated with a node in a network, comprising:
program code for receiving, at the node, a signal requesting a connection to the destination;
program code for determining a source of the signal;
program code for determining, at the node, preference information reflecting a desire on behalf of the destination to accept a connection from the source;
program code for requesting the connection between the source and the destination based on the determination of the preference information; and
updating the preference information based on whether the connection is accepted in response to the connection request.

12. The computer-readable medium according to claim 11, further comprising:
program code for determining, at the node, whether the connection was accepted; and
program code for modifying an account associated with the destination when the connection was accepted and the program code for determining preference information determined that the destination did not desire to accept the connection.

13. The computer-readable medium according to claim 11, wherein the program code for requesting the connection between the source and the destination based on the determination, comprises:
program code for sending a caller-id signal indicating the desire on behalf of the destination to accept the connection.

14. The computer-readable medium according to claim 11, wherein the program code for requesting the connection between the source and the destination based on the determination, comprises:
program code for sending a caller-id signal indicating the destination does not desire to accept the connection.

15. The computer-readable medium according to claim 14, further comprising:
program code for declining, at the destination, the connection based on the preference information.

16. A node within a network for eliminating unwanted calls, comprising:
an input for receiving a signal, from a source, requesting a connection to a destination;
a processor for determining a source of the signal;
a registry for storing information reflecting a desire on behalf of the destination to accept a connection from the source; and
a signaling module for providing the information to the destination and requesting the connection between the source and the destination,
wherein the processor and signaling module update the information in the registry based on whether the connection is accepted.

17. The node according to claim 16, further comprising:
a memory for storing information indicating an account balance for the destination; and
wherein the processor modifies the account balance based upon whether the destination accepts the connection.

18. The node according to claim 16, wherein the signaling module utilizes caller-id signaling.

19. A computer-readable medium referenced by a node within a network for eliminating unwanted phone calls comprising:
information identifying at least one destination;
information identifying at least one source; and
information reflecting a desire on behalf of the at least one destination to accept a connection from the at least one source wherein the information reflecting a desire on behalf of the at least one destination is updated based on behavior of the destination.

20. The computer-readable medium according to claim 19, further comprising:
information tracking a history of accepted calls by the at least one destination.

21. The computer-readable medium according to claim 19, further comprising:
information tracking a history of declined calls by the at least one destination.

22. A processor within a network for eliminating unwanted calls, comprising:
input means for receiving a signal requesting a connection to destination;
a module for determining a source of the signal;
a module for determining information reflecting a desire on behalf of the destination to accept a connection from the source; and output means for requesting a connection between the source and the destination based on the determinations; and means for updating the information reflecting a desire on behalf of the destination to accent a connection from the source based on behavior of the destination.

23. A node for receiving a connection across a network, comprising:

an input means for receiving a signal requesting a connection from a source;

means for identifying information reflecting a desire on behalf of the node to accept the connection from the source; and means for establishing the connection between the node and the source based on the information; and means for updating the information reflecting a desire on behalf of the node to accept a connection from the source based on behavior of the node.

24. The method of claim 1, wherein the information reflecting a desire on behalf of the destination to accept a connection from the source is based in part on behavior of the source.

25. The system of claim 6, wherein the information reflecting a desire on behalf of the destination to accept a connection from the source is based in part on behavior of the source.

26. The computer-readable medium of claim 11, wherein the information reflecting a desire on behalf of the destination to accept a connection from the source is based in part on information indicating types of sources from which the destination has previously accepted connections.

27. The node of claim 16, wherein the information reflecting a desire on behalf of the destination to accept a connection from the source is based in part on information indicating types of sources from which the destination has previously accepted connections.

28. A method of eliminating an unwanted connection to a destination associated with a node in a network, comprising the steps of:

receiving, at the node, a signal requesting a connection to the destination;

determining a source of the signal;

determining, at the node, whether or not the source is an approved source based on approval information, wherein the approval information is based in part on behavior of the destination;

requesting the connection between the source and the destination when the source is an approved source; and determining whether the source accepts a charge associated with the connection when the source is not an approved source and, if the unapproved source accepts the charge, requesting the connection between the unapproved source and the destination, including noticing the destination that the source is not an approved source.

29. The method of claim 28, further comprising updating the approval information based on whether the connection was accepted in response to the connection request when the source is an approved source.

30. The method of claim 29, further comprising updating the approval information based on whether the connection was accepted in response to the connection request between the unapproved source and the destination.

31. The method of claim 28, further comprising compensating the destination when the destination accepts the connection from the unapproved destination.

32. The method of claim 31, wherein compensating comprises automatically crediting an account associated with the destination.

* * * * *